(12) United States Patent
Sekido

(10) Patent No.: US 6,219,752 B1
(45) Date of Patent: Apr. 17, 2001

(54) DISK STORAGE DATA UPDATING METHOD AND DISK STORAGE CONTROLLER

(75) Inventor: Kazunori Sekido, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/128,774

(22) Filed: Aug. 4, 1998

(30) Foreign Application Priority Data

Aug. 8, 1997 (JP) .................................................. 9-214656

(51) Int. Cl.[7] .................................................. G06F 12/02
(52) U.S. Cl. .......................................... 711/114; 711/111
(58) Field of Search .................................. 711/162, 161, 711/111, 114, 202, 209, 112, 170

(56) References Cited

U.S. PATENT DOCUMENTS

| 5,124,987 | * | 6/1992 | Milligan et al. ...................... 714/710 |
| 5,195,100 | * | 3/1993 | Katz et al. .............................. 714/22 |
| 5,233,618 | * | 8/1993 | Glider et al. .......................... 714/820 |
| 5,475,697 | * | 12/1995 | Katz et al. ............................ 711/159 |
| 5,758,054 | * | 5/1998 | Katz et al. .............................. 714/22 |
| 6,058,455 | * | 5/2000 | Islam et al. ........................... 711/114 |

* cited by examiner

Primary Examiner—Eddie P. Chan
Assistant Examiner—Jan S. Williams, II
(74) Attorney, Agent, or Firm—Finnegan, Henderson, Farabow, Garrett & Dunner, L.L.P.

(57) ABSTRACT

A disk storage system with a RAID architecture, where the disk memory has N units of disks, includes a control unit to write data to the N units of disks or read data therefrom based on instructions from a host equipment, a volatile memory connected to the control unit, and a non-volatile memory connected to the control unit. The volatile memory includes a time stamp memory and a conversion map. The non-volatile memory includes a write buffer, which has a capacity of N×K logical block data (N is a positive integer not less than 2 and K is an integer indicating the number of blocks), and a buffer management table. The control unit accumulates logical block data to be updated in the write buffer until the number of logical blocks reaches N×K−1. It generates logical address tag blocks, including time stamps stored in the time stamp memory and adds them to the N×K−1 logical blocks. The controller then performs a continuous write operation to write N×K logical blocks into empty address areas different from the areas in which data to be updated is stored.

20 Claims, 14 Drawing Sheets

Fig.5

|  |  |  |  |
|---|---|---|---|
| B1 | B5 | B9 | B13 |
| B2 | B6 | B10 | B14 |
| B3 | B7 | B11 | B15 |
| B4 | B8 | B12 | TG3 |

ST3

|  |  |  |  |
|---|---|---|---|
| B16 | B20 | B24 | B28 |
| B17 | B21 | B25 | B29 |
| B18 | B22 | B26 | B30 |
| B19 | B23 | B27 | TG4 |

ST4

|  |  |  |  |
|---|---|---|---|
| B2 | B13 | B21 | B27 |
| B7 | B18 | B22 | B29 |
| B8 | B19 | B24 |  |
| B12 | B20 | B25 | TG5 |

|   |   |   | L14 |
|---|---|---|-----|
| L11 |   |   |   |
|   | L13 |   |   |
|   | L7 | L3 | T3 |

TG3

|   | L37 | L51 |   |
|---|-----|-----|---|
|   | L41 | L46 | L55 |
| L25 | L22 |   |   |
| L23 |   | L38 | T4 |

TG4

| L11 | L14 | L41 | L38 |
|-----|-----|-----|-----|
| L13 | L25 | L22 | L55 |
| L7 | L23 | L51 |   |
| L3 | L37 | L46 | T5 |

| LOGICAL ADDRESS | ST# | BLK# | TS# |
|-----------------|-----|------|-----|
| L0 |   |   |   |
| L1 |   |   |   |
| L2 |   |   |   |
| ⋮ |   |   |   |

Fig.8

| SG# | CONVERSION MAP AT CHANGE OVER |
|---|---|

SEGMENT MANAGEMENT INFORMATION

DISK STORAGE DATA UPDATING METHOD AND DISK STORAGE CONTROLLER

BACKGROUND OF THE INVENTION

The present invention relates to disk array storage devices such as RAID (Redundant Array of Inexpensive Disk), etc. using a plurality of disk memories and more particularly to storage data reading methods from disk array memories and control devices. The RAID system storage disclosed in U.S. Pat. No. 5,124,987, Japanese Patent No. 214720/1994 and 266510/1994, proposes a high speed writing method to memories. A method to write updated-data collectively in previously arranged separate empty areas in disk memory units (hereinafter simply referred to as disk memory units) instead of rewriting old data areas and a rewriting method of old data areas in idle times when made available thereafter were proposed.

The conventional methods described above will be briefly described using FIG. 18. In FIG. 18, an example involving updating data blocks stored in logic block addresses (hereinafter simply referred to as logic addresses) L6, L4, L2, L132, L7 and L11 is considered. In these logic block addresses L6, L4, L2, L12, L7 and L11, old data is stored in physical block addresses (hereinafter simply referred to as physical addresses) P6, P4, P2, P12, P7 and P11 in 3 disk units 181, 182 and 193. First, the data blocks 16Data, L4Data, L2Data, L12Data, L7Data and L11Data that are newly to be updated are stored temporarily in a buffer memory 184 which is normally composed of a non-volatile memory. These data blocks are collectively written into physical addresses P51, P52, P53, P54, P55 and P56 which are previously arranged separate empty areas instead of directly replacing data that are the contents of the physical block addresses P6, P5, P2 and P12 in which old data to be updated are stored, with old data left therein. As these data are written into continuous physical addresses P51–P52, P53–P54 and P55–P56 in 3 disk units 181, 182 and 183, 6 times of writing operation required for the direct rewriting are physically reduced to 3 times of the writing operation and thus, the writing performance is largely improved.

On the other hand, in this type of conventional disk array storage systems, there is provided a conversion map 185, that is a table showing the correspondence between logical addresses and physical addresses in which data blocks are stored. When updating data, as latest data in the logical addresses L6, L5, L2, L12, L7 and L11 are actually existing in the physical addresses P51, P52, P53, P54, P55 and P56 in the disk units as described above, the contents of the conversion map are rewritten to indicate proper disk locations. In other words, for instance, data blocks in the logical address L6 must originally be stored in the physical address P6 in the disk unit 181 but as actually they are stored in the physical address P51, the physical address P6 corresponding to the logical address L6 in the conversion map 185 is rewritten to P51. Similarly, the physical addresses corresponding to the logical addresses L5, L2, L12, L7 and L11 in the conversion map 185 are rewritten to P52, P53, P54, P55 and P56, respectively.

Further, when reading data stored in the disk array storage, data is read out by obtaining physical addresses wherein latest data blocks corresponding to designated logical addresses are stored are read out and therefore, there is no possibility to read out old data.

Further, in order to make the explanation simple, although only two physical blocks were written in the example shown in FIG. 18 as data blocks that are stored in one disk unit, several ten blocks are actually written in one disk unit.

SUMMARY OF THE INVENTION

In the conventional technique described above, there was a problem of data maintenance, in that all data stored in a disk memory unit was lost if latest data was erased by failure or erroneous operation of an conversion map as the positional information of latest data was managed by the conversion map. Further, there was also a problem that a conversion map becomes highly expensive because it was needed to provide an conversion map for all logic blocks and to retain the conversion map in a large capacity for power source failure.

The present invention solves the problems described above and it is an object of the present invention to provide an inexpensive and high speed data updating method for a control system for a disk storage system.

The disk storage data updating method of the present invention is characterized in that, the disk memory is equipped with N units of disk unit, a control unit to write data to the N units of disk unit or read data therefrom according to instructions from a host equipment, a volatile memory connected to this control unit, including a time stamp memory and a conversion map memory and a non-volatile memory connected to the control unit, including a write buffer memory having a memory capacity equivalent to N×K (an integer) logical block data and a buffer management table memory. The data updating method accumulates logical block data to be updated in the write buffer memory until the number of logical blocks reaches N×K−1, generates logical addresses for these logical blocks and logical address tag blocks including time stamps stored in a time stamp memory and adds them to the N×K−1 logical blocks to a total N×K logical blocks and sequentially writes into empty address areas separate from logical address areas that are retaining data to be updated on the N units of disk storage successively.

In the disk storage data updating method of the present invention, it is further characterized in that data is written in a stripe area extending over a plurality of disk units.

In the disk storage data updating method of the present invention, it is further characterized in that the time stamp memory is incremented whenever N×K logical blocks accumulated in the write buffer memory are written into N units of disk unit.

In the disk storage data updating method of the present invention, it is further characterized in that physical storage locations on the disk units corresponding to logical addresses are detected by reading and inspecting logical address tag blocks in the stripe areas recorded in the disk units and data is written in or read out of the detected storage locations.

In the disk storage data updating method of the present invention, it is further characterized in that when inspecting the logical address tag blocks, if there are a plurality of stripe areas containing the same logical address, when the time stamp in the logical address tag block is latest, the logical address blocks in that stripe area are judged to be valid blocks and blocks having the same logical address as those in other stripe areas are judged to be invalid blocks.

In the disk storage data updating method of the present invention, it is further characterized in that when inspecting the logical address tag blocks, by detecting the maximum time stamp value, a time stamp to be added in the next writing is reproduced.

In the disk storage data updating method of the present invention, it is further characterized in that when inspecting the logical address tag blocks, the time stamp value that becomes the writing sequence standard is obtained by detecting the minimum time stamp value.

In the disk storage data updating method of the present invention, it is further characterized in that by reading out the logical block data in a plurality of stripe areas stored in the disk storage and inspecting the logical address tag blocks, only valid logical blocks in the stripe areas are moved in the write buffer memory, new logical address tag blocks corresponding to these valid logical blocks are generated, and by sequentially writing logical blocks for one stripe comprising the valid data moved in the write buffer and newly generated logical address tags in empty areas separate from a plurality of read out stripe areas, an empty area is produced on the disk storage, into which logical blocks can be written successively.

In the disk storage data updating method of the present invention, it is further characterized in that when generating a new logical address tag block, if the number of valid blocks is less than N×K−1, a NULL address is set for a logical address corresponding to a block in which data in a new logical address tag block is not stored.

In the disk storage data updating method of the present invention, it is further characterized in that by performing the inspection of the logical address tag blocks in a plurality of stripe areas when starting up the disk unit after writing data in the empty area of the disk unit, the stripe numbers for the logical addresses which are judged to be valid, the block numbers in the stripes and the time stamps of the valid data are recorded in the conversion map.

In the disk storage data updating method of the present invention, it is further characterized in that logical address tag blocks of the stripes in the time zone with less access to the disk unit are read and compared with the conversion map and a correction is made.

In the disk storage data updating method of the present invention, it is further characterized in that when the disk units in which the logical address tag blocks are dispersed and arranged by stripe and the logical address tag blocks are inspected, the logical address tag blocks of different disk units are read out in parallel.

In the disk storage data updating method of the present invention, it is further characterized in that the logical address tags are sequentially written in the stripe areas together with the logical block data and are also written in the dedicated tag areas in parallel, and when inspecting the logical address tag blocks, the logical address tag blocks are checked by sequentially reading this dedicated tag areas.

In the disk storage data updating method of the present invention, it is further characterized in that the storage areas of the disk unit are divided into a plurality of segments in a plurality of stripes and controlled so that stripe data are written in only one segment in a fixed period. In addition, when the write object segment is changed over, the contents of the conversion map at the point of time and the change-over segment number are recorded in the disk unit. In the subsequent conversion map preparation, the contents of the conversion map when the segment was changed over and only those logical address tag blocks where a bit map is set among the logical address tags written in the stripe area in the segment number recorded in the disk unit are inspected.

In the disk storage data updating method of the present invention, it is further characterized in that a bit map corresponding to the stripe in the segment on the non-volatile memory is prepared and when a write objective segment is changed over, this bit map is cleared, when writing data in the stripe area, a bit corresponding to the stripe area into which data were written is set and when preparing a conversion map, the conversion map at the time when the disk unit segment was changed over and only a logical address tag in which the bit map is set among the logical address tags having the segment numbers recorded in the disk unit are inspected.

In the disk storage data updating method of the present invention, it is further characterized in that in order to advance the minimum value of time stamp, by reading stripes with less invalid blocks periodically, valid blocks only are moved to the write buffer, a logical address tag block is generated from the logical addresses in the corresponding logical tag block and a new time stamp and stripes comprising the valid data in the write buffer and the generated logical address tag blocks are sequentially written in an empty area separate from the areas retaining the read stripes.

In the disk storage data updating method of the present invention, it is further characterized in that in order to advance the minimum value of time stamp, by reading out the logical address tag blocks only from stripes with less invalid blocks periodically, the logical address tag blocks added with a new time stamp and the logical address of invalid blocks made NULL address are generated and the logical address tag blocks generated here are overwritten on the read out logical address tag blocks.

In the disk storage data updating method of the present invention, it is further characterized in that after preparing the conversion maps, invalid blocks are determined by comparing the time stamp of the logical address tag blocks on the disk unit with the time stamp of the corresponding conversion map.

In the disk storage data updating method of the present invention, it is further characterized in that it is equipped with a write buffer having a capacity equivalent to (N−1)×K logical blocks, the logical blocks of data to be updated are accumulated in this write buffer memory, the updating of the logical block is retarded until the number of logical blocks accumulated reaches a selected number, a logical address tag block composed of logical addresses of the logical blocks accumulated in the write buffer is generated, K parity blocks from (N−1)×K data logical blocks with the logical address tag block added to the selected number of logical blocks are generated and N×K logical blocks with parity block added to this data logical block are sequentially written in an empty area separate from the areas retaining data to be updated on N units of disk unit.

In the disk storage data updating method of the present invention, it is further characterized in that the number of selected logical data blocks is (N−1)×K−1 and the logical address tag blocks are recorded in one disk unit.

In the disk storage data updating method of the present invention, it is further characterized in that the number of selected logical data blocks is (N−1)×K−2 and two logical address tag blocks are allocated so that the logical tag blocks are recorded in two disk units in one parity stripe.

In the disk storage data updating method of the present invention, it is further characterized in that to inspect the logical address tag blocks recorded in the disk units, in addition to the sequential write in unit of parity stripe, the logical address tags are written in the dedicated tag areas in which logical address tags are collected and the written data in this dedicated tag areas are not protected by parity but the dedicated tag areas are so allocated that the disk unit in which logical address tags in the parity stripes are recorded is different from the disk unit in which the logical address tags in the dedicated tag area are recorded.

The disk storage controller of the present invention is characterized in that it is equipped with N units of disk unit, a control unit to write or read data in or from N units of disk unit according to instructions from a host equipment and a disk storage comprising a volatile memory connected to the control unit, including a time stamp memory and a conversion map memory, a non-volatile memory connected to the control unit, including a write buffer memory having a storage capacity equivalent to N×K (an integer) logical block data and a buffer management table memory, and logical block data to be updated in the write buffer are accumulated until the number of logical blocks reaches N×K−1, a logical address tag block containing logical addresses for these logical blocks and time stamps stored in the time stamp memory are generated, this logical address tag block is added to the N×K−1 logical blocks to a total N×K logical blocks, and this total N×K logical blocks are sequentially written in an empty address area separate from the logical address areas retaining data to be updated on the N units of the disk unit successively.

In the disk storage controller of the present invention, it is characterized in that it is equipped with a volatile memory storing time stamps to maintain the time sequence of write, a write buffer memory to retain data to be written into the disk units in a log structure and a non-volatile memory storing buffer management information retaining logical address information on empty areas in the write buffer memory and logical addresses of written data retained therein.

The disk storage controller of the present invention is characterized in that it is equipped with a disk storage comprising N units of disk units, a write buffer memory having a capacity equivalent to (N−1)×K logical blocks and a sequential write control unit which accumulates logical blocks of data to be updated in this write buffer, retards the updating of the logical blocks until the number of accumulated logical blocks reaches a selected number, generates a logical address tag block comprising logical addresses of logical blocks accumulated in the write buffer, generates K parity blocks from (N−1)×K data logical blocks with the logical address tag block added to the selected number of logical blocks and writes N×K logical blocks with parity blocks added to this data logical blocks in an empty area separate from areas retaining data to be updated on N units of disk unit successively.

The disk storage controller of the present invention is characterized in that it is equipped with a redundant disk unit to form a redundant disk structure using parity, a volatile memory to store time stamps to maintain a time sequence of writing, a write buffer to retain data to be written in the disk units in a log structure and a nonvolatile memory to store buffer management information on empty areas in the write buffer and logical address information of retained data written therein.

By forming the above described structure, it is possible to construct a cheap and high speed disk storage principally requiring no indirect map and a disk storage control system.

BRIEF DESCRIPTION OF THE DRAWINGS

FIG. 5 is a diagram illustrating the contents of logical address tags TG1/TG2 of stripes ST1, ST2 in the embodiment in FIG. 4;

FIG. 6 is a diagram illustrating an example to integrate stripes ST3/ST4 into one stripe ST5;

FIG. 7 is a diagram illustrating an example of a case wherein a logical address tag TG5 is produced from the logical address tags TG3/TG4 in the stripe integration;

FIG. 8 is a block diagram illustrating a configuration example of a conversion map that is used in the embodiment of the present invention;

DESCRIPTION OF THE INVENTION

Figure 1:
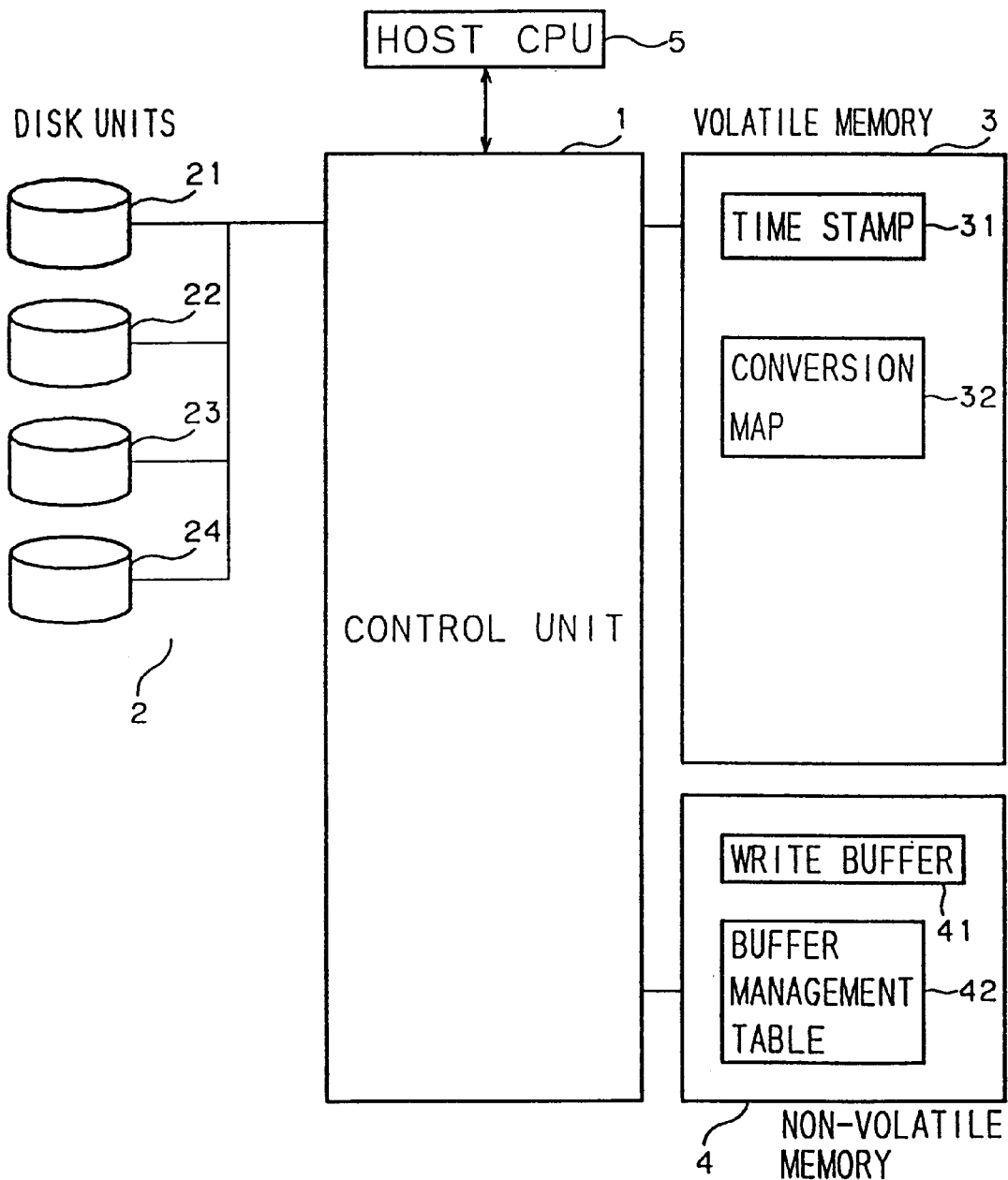
FIG. 1 is a block diagram illustrating an embodiment of the present invention.

FIG. 1 is a block diagram illustrating the concept of a disk storage consistent with the present invention. The disk storage control system of the present invention is composed of a control unit 1, a disk unit 2, a volatile memory 3 and a non-volatile memory 4. The disk unit 2 is composed of a plurality of disk storage units. In order to make the explanation simple, this embodiment will be explained as being composed of 4 disk storage units 21, 22, 23, 24. The volatile memory 3 is provided with a time stamp area 31 and an indirect mapping storage area 32 for storing time sequence of write operation. The non-volatile memory 4 is provided with a write buffer area 41 to retain data to be written in the disk unit 2 by forming them in a log structure and a buffer management table 42 to retain information on empty areas in the write buffer area 41 and logical addresses of write data retained therein. The control unit 1 manages the time stamp area 31, the write buffer area 41 and the buffer management table 42 according to an instruction from a host equipment 5 and controls the write operations to the disk unit 2.

Figure 2:
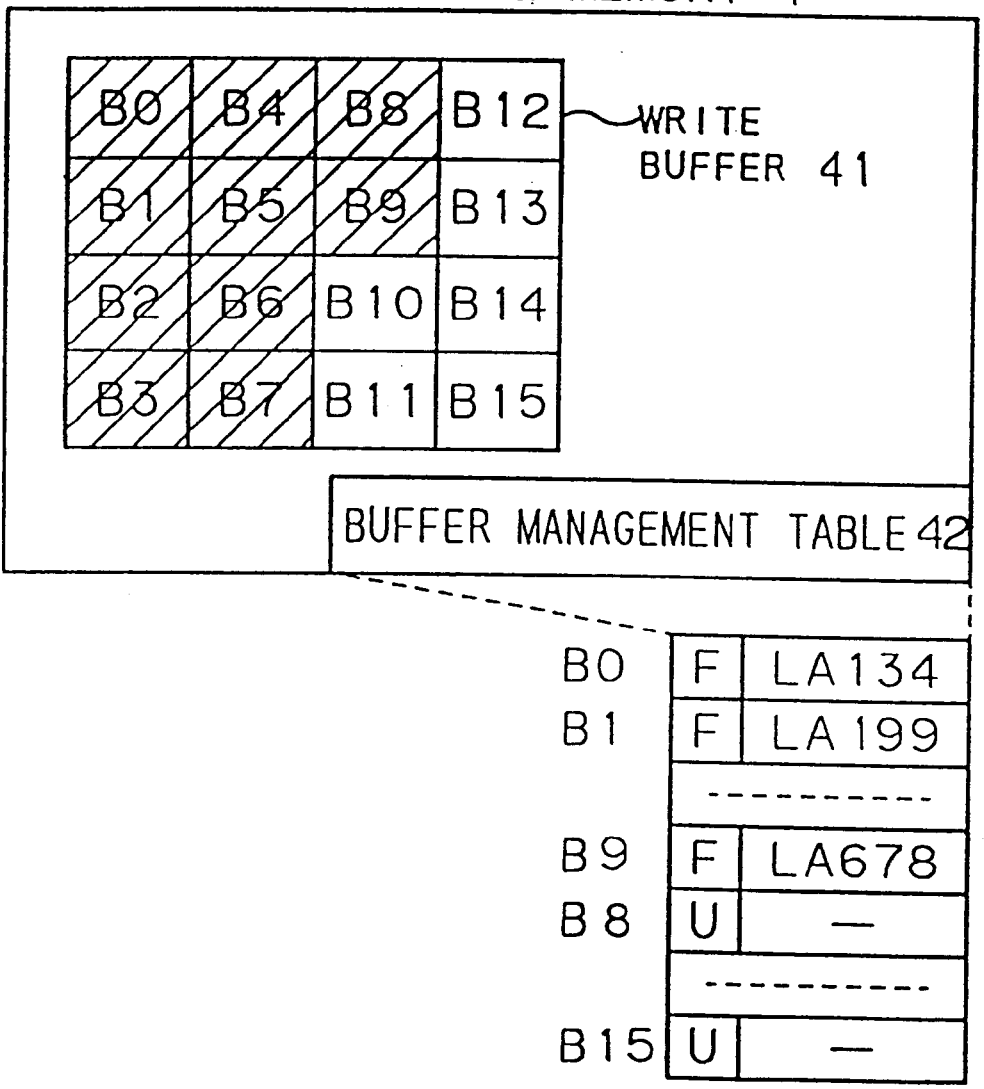
FIG. 2 is a diagram illustrating the relation between a write buffer memory and buffer management information in the embodiment of the present invention.

FIG. 2 illustrates the relation between the write buffer area 41 and the buffer management table 42 allocated in the non-volatile memory 4. The control unit 1 does not write data requested for writing from an externally connected host equipment directly into the disk unit 2 but divides the data in unit of block and stores in order (in a log format) in the write buffer area 41. Here, the buffer table 42 is in a table structure comprising a plurality of entries and the logical address of each data block viewed from a host equipment to be written in these entries while corresponding to the block locations B0, B1, . . . , B15 in the buffer area 41. Further, the flag "F" is provided to an entry to which data is allocated and the flag "U" to an entry to which no data is allocated.

In the example illustrated in FIG. 2, the write data is stored in the block locations up to B9 in the write buffer area 41 and it is indicated that the logical addresses of B0, B1, . . . B9 are LA134, LA199, . . . , LA678.

Further, for the disk storage units 21–24 of the disk unit 2, data in the length equivalent to K blocks, which are integer (K) times of block size in a unit of storage area called as stripe unit (a size close to 1 track length of the disk unit is better) is written. Also, to the stripe units at the physically same locations of the disk storage units 21–24, data is written at the same time regarding them as one stripe area (ST) as a whole.

Further, the disk unit 2 is shown to the host equipment 5 as a disk unit in a capacity less than actual combined storage capacity of a plurality of disk storage units 21–24. In other words, if the host equipment is first inquired for its storage capacity, a less capacity is returned as a response. Therefore, in addition to the storage areas that can be logically read/ written from the host equipment 5, an excess storage area, that is, an empty area is secured.

Further, the time stamp 31 is an information that is added to write data from the host equipment 5 when the data is actually written into the disk unit 2 and is used to determine the data write sequence into the disk unit 2. So, the time stamp 31 is incremented every time when data of the write buffer 41 is written in the disk unit 2.

Next, the operation of the embodiment of the present invention will be described in detail referring to FIG. 2 through FIG. 8.

First, the write operation will be described. After receiving data to be written and its logical addresses from the host equipment 5, the control unit 1 divides the data in unit of block and sequentially stores them in the empty area of the write buffer 41 on the non-volatile memory successively as illustrated in FIG. 2. Further, in FIG. 2, data is sequentially written in an empty area equivalent to the length of 15 blocks comprising B0, B1, . . . , B15 of the write buffer 41 successively.

Further, the received logical addresses are converted into addresses for every blocks and stored in the corresponding entries B0, B1, . . . B15 of the buffer management table 42. Further, in the case of update data for those data already stored in the write buffer 41, they are not stored sequentially in the empty areas of the write buffer 41 but old data stored in the write buffer 41 is directly updated.

Figure 3:
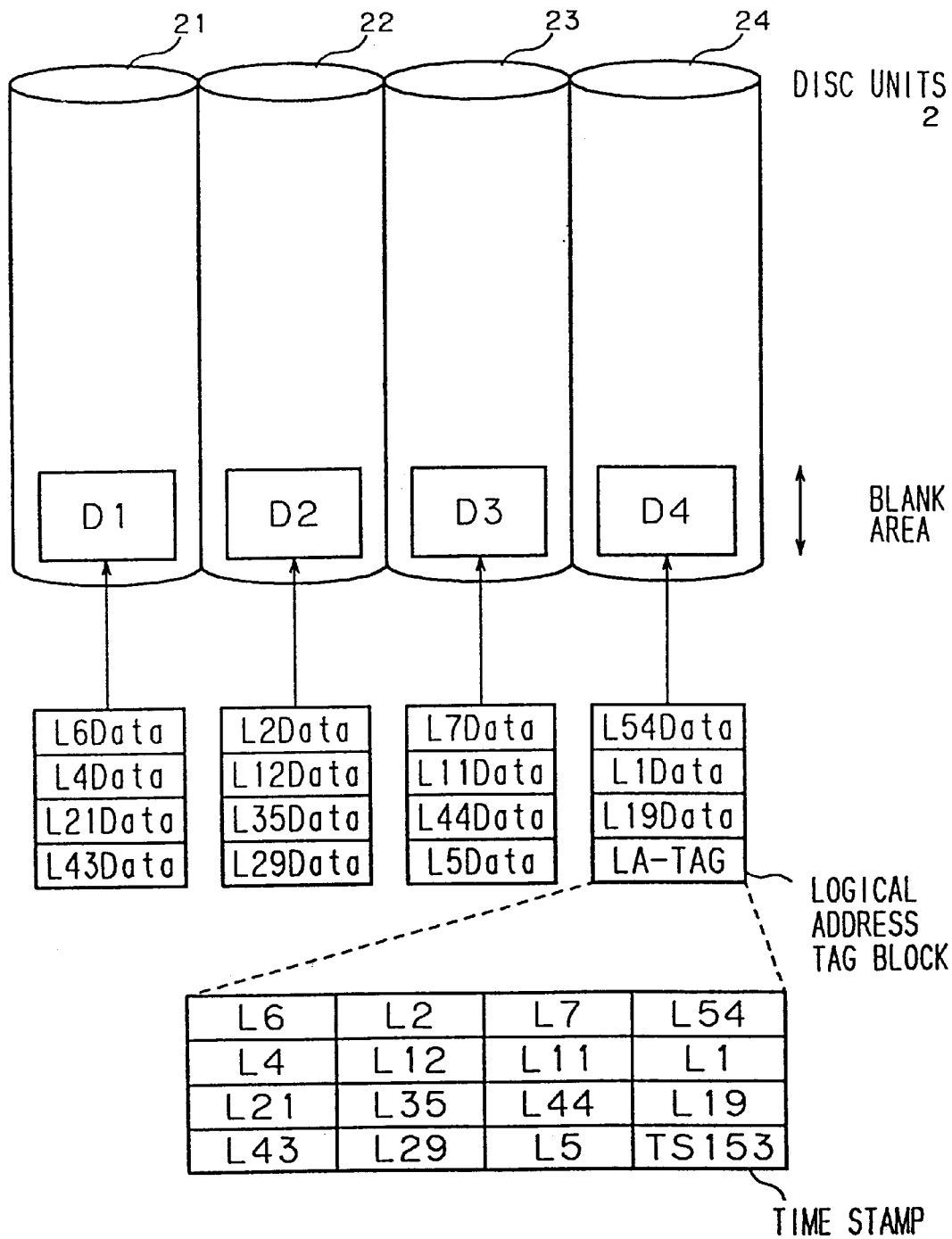
FIG. 3 is a diagram illustrating the contents that are stored in an empty area of a disk unit in the embodiment of the present invention.

At the stage where write data from the host equipment 5 is accumulated in the write buffer 41 in the numbers less by 1 block than 1 stripe (ST) of the disk unit 2, that is, (4K−1), the control unit 1 writes these data in the disk unit 2. In FIG. 2, at the stage where data is accumulated in the write buffer 41 by K=4, that is, for 15 blocks, they are written in the disk unit 2. At this time, as the last write block, the logical address tag block LA-TAG as illustrated in FIG. 3 is prepared from the logical addresses of the blocks stored in the write management table in the buffer management information 42 and the time stamp 31 on the volatile memory 3. The 1 for 1 relation is preset between the address data and data blocks in this logical address tag blocks so that the logical addresses of all data blocks can be seen.

Thereafter, as illustrated in FIG. 3, data for 1 stripe including this logical address tag block are simultaneously written into the empty areas of the disk storage units 21–24 collectively. In FIG. 3 the empty areas for 1 stripe (ST) of the disk storage units 21–24 are shown in 4 unit stripes D1–D4 and the logical addresses of 4 data blocks that are written in these unit stripes D1–D4 areas are shown. Further, the value of the time stamp 31 illustrated in FIG. 1 is incremented when the write is completed. Thus, the disk writing performance is sharply improved as many fine disk writings can be made at one time.

Next, the data block refilling process will be described. In the disk write method that is an object of the present invention, that is, a method to accumulate updating data and write in a previously provided other empty area in the disk unit 2 collectively instead of directly rewriting the old data area, it is imperative to have available an empty area for collectively writing data collected in the disk unit 2. Therefore, it is possible to make an empty area by collecting invalid data as data were already written in other areas in an idle time when the disk access from the host equipment 5 is not executed. This process is called the refilling process. This refilling process is composed of two steps; the invalid block judging and the stripe consolidation steps.

Figure 4:
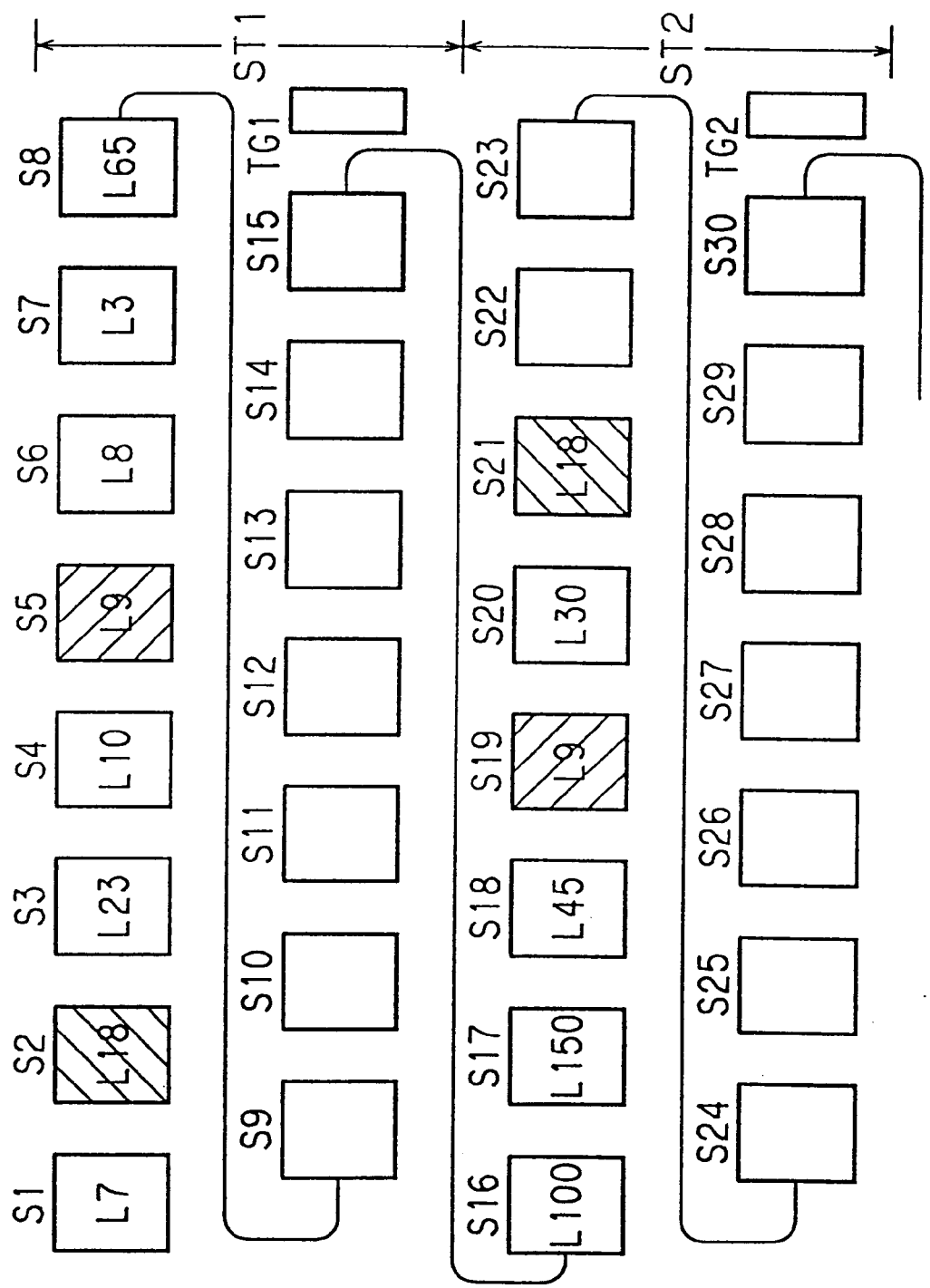
FIG. 4 is a diagram quoted for illustrating one block size data write sequence from a host equipment.

As an example of the invalid block judgment, a case is considered, where there is 1 block size data writing from the host equipment 5 in the order illustrated in FIG. 4. LXX in the figure indicates logical addresses given by the host equipment and SXX indicates the writing sequence. In the embodiment of the present invention, as the write buffer 41 is able to retain data of 15 blocks, write data of the first S1 through S15 are collected in one stripe (ST1) and written into an empty area with the time stamp TS1 added. Similarly, write data of S16–S30 are written in another empty area as another stripe (ST2) with the time stamp TS2 added. Further, as the time stamp 31 is incremented whenever the writing is made, there is the relation of TS1<TS2.

Here, as seen in FIG. 4, the data of the logical addresses L9 and L18 exist as S5 and S2 in the stripe of the time stamp ST1 and also as S19 and S21 in the stripe of the time stamp TS2. That is, there are two data that are to be written into the same logical addresses L9 and L18. However, when considering the sequencer of written data blocks, the data blocks of S19 and S21 that were written later are effective and therefore, S5 and S2 data must be judged to be invalid.

Figure 5:
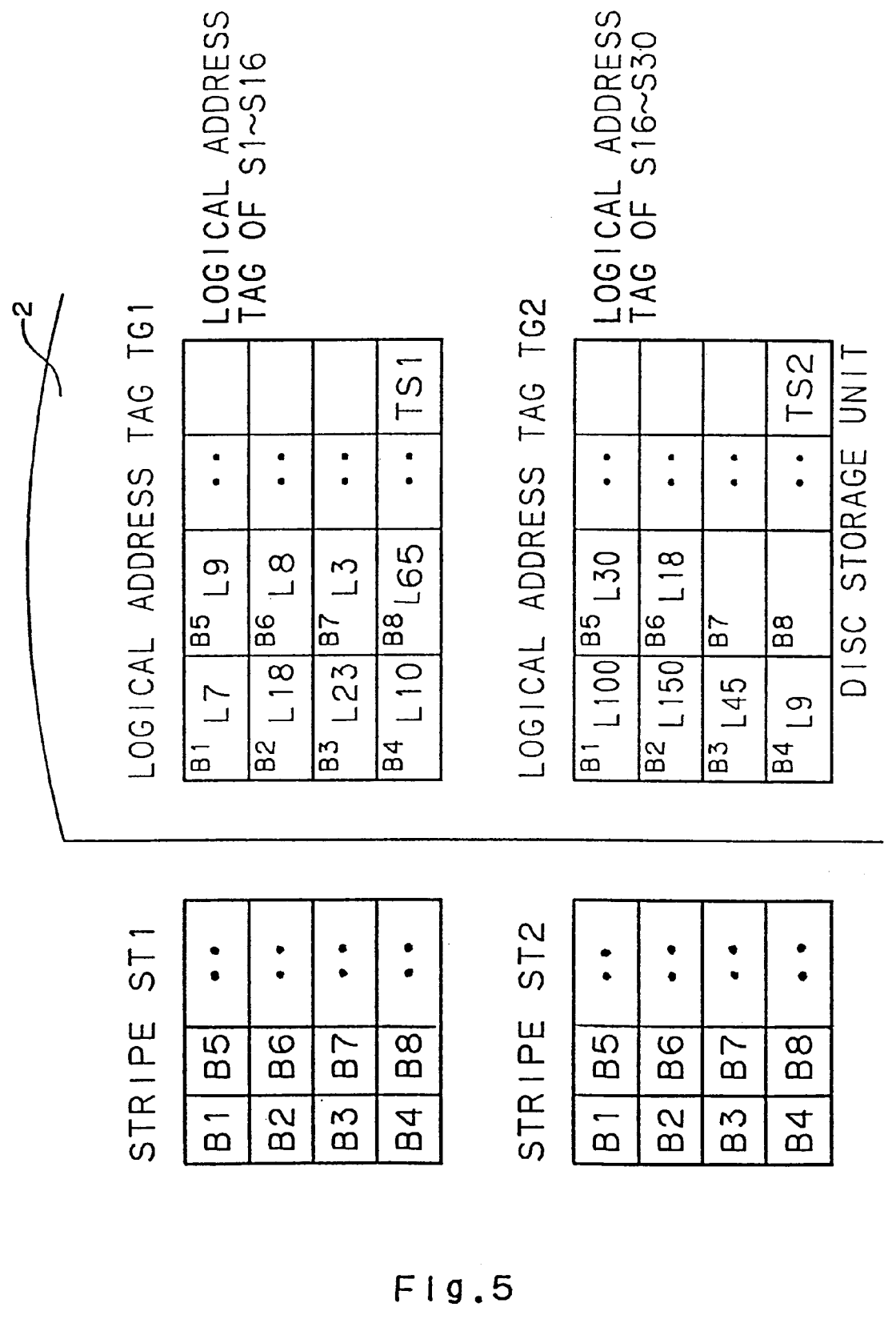

By the way, the writing order SXX that was used here for the convenience was not recorded on an actual disk. So, this judgment is made using the logical addresses added to the stripes. The contents of the logical address tags TG1, TG2 of two stripes ST1, ST2 in the example in FIG. 4 are as illustrated in FIG. 5. That is, for the logical address tags TG1, TG2, the logical addresses of the blocks are stored in the storage areas corresponding to 15 blocks; B0, B1–B15 that are written into the buffer 41 and the time stamps TS1, TS2 when the stripes ST1, ST2 are written will be written in the 16th storage area.

As can be seen in FIG. 5, the data of the same logical addresses L9, L18 are contained in two logical address tags TG1, TG2 and either data of the blocks B5, B2 of the stripe ST1 or the blocks B4, B6 of the stripe ST2 are invalid. Further, when the time stamp TS1 of the logical address tag TG1 is compared with the time stamp TS2 of the logical address tag TG2, it is possible to judge that the blocks B5, B2 of the stripe ST1 are invalid from the relation of TS1<TS2. As described above, it is possible to find an invalid data block by checking the logical address tags in the disk unit 2.

FIG. 6 is a diagram illustrating an example of consolidating stripes and a case to consolidate two stripes ST3 and ST4 into one stripe ST5 is shown. In FIG. 6, it is assumed that five blocks B2, B7, B8, B12 and B13 are valid in the stripe ST3 and other 10 blocks are invalid (hatching). Similarly, 9 blocks B18, B19, B20, B21, B22, B24, B25, B27 and B29 are assumed to be valid in the stripe ST4 and other 6 blocks are invalid (hatching). Therefore, since there are only 14 valid blocks in two stripes ST3, ST4, when the valid blocks of these two stripes ST3, ST4 are taken out and consolidated into one stripe ST5, an empty area equivalent to one stripe can be produced as a result.

A definite method of the stripe consolidation is as follows: read two stripes ST3, ST4 shown in FIG. 6 in the volatile memory 3, take out only valid blocks of these two stripes ST3, ST4 and move them into the write buffer 41 successively. In consonance with this, move logical addresses of the valid blocks only from TG3, TG4 to corresponding locations, prepare a new logical address tag TG5 and update a time stamp at the point of that time to ST5 as shown in FIG. 7.

As there are only 14 valid blocks in this example, a stripe having one write block from the host CPU 5 is completed and the data is written in an empty area of the disk unit 2 in bulk. In this case, the disk areas are efficiently used. If, however, a disk access is made from the host CPU 5 in the first mode, since write processing is waited, excessive disk accesses are likely to be made. For this reason, the last data block may be kept empty to allow data to be written therein while no disk access is made. No problems are posed as it is possible to indicate that no data is in the last data block of the logical address tag TG5 by inserting NULL address such as −1, etc. in the logical address of the last data block.

Next, the read operation of data blocks written as described above will be explained. By performing the judgment of invalid blocks of the refilling process for the logical address tags of all stripes in the disk unit 2, the physical locations of valid blocks for all logical addresses can be detected. Therefore, it is theoretically possible to detect physical blocks to be read by checking all stripes whenever logical addresses of read blocks are received from the host equipment 5. However, this method requires an enormous time for block reading and is not practical to use.

So, the logical address tags of all stripes are checked only when starting up the system and a conversion map 32 of logical addresses to physical addresses is prepared on the volatile memory 3 illustrated in FIG. 1. Then, the access to valid blocks is performed using this conversion map 32 for the read request from the host equipment 5. As a result, it becomes unnecessary to check address tags whenever the block read is requested by the host equipment 5 and the performance will never drop at the time of reading. Further, as this conversion map 32 can be reproduced any time by checking all stripes and it is also unnecessary to store this conversion map in the non-volatile memory 4 providing for the power source failure as in a conventional indirect map.

Here, the conversion map 32 will be explained using FIG. 8. As illustrated in FIG. 8, the conversion map 32 retains the stripe number ST# storing blocks for the logical addresses L0–Ln, block numbers BLK# in the stripes and further, the time stamp TS# in a format of table. So, if the logical addresses L0–Ln are given, actual physical addresses can be obtained simply from ST# and BLK# by referring to this table.

Figure 9:
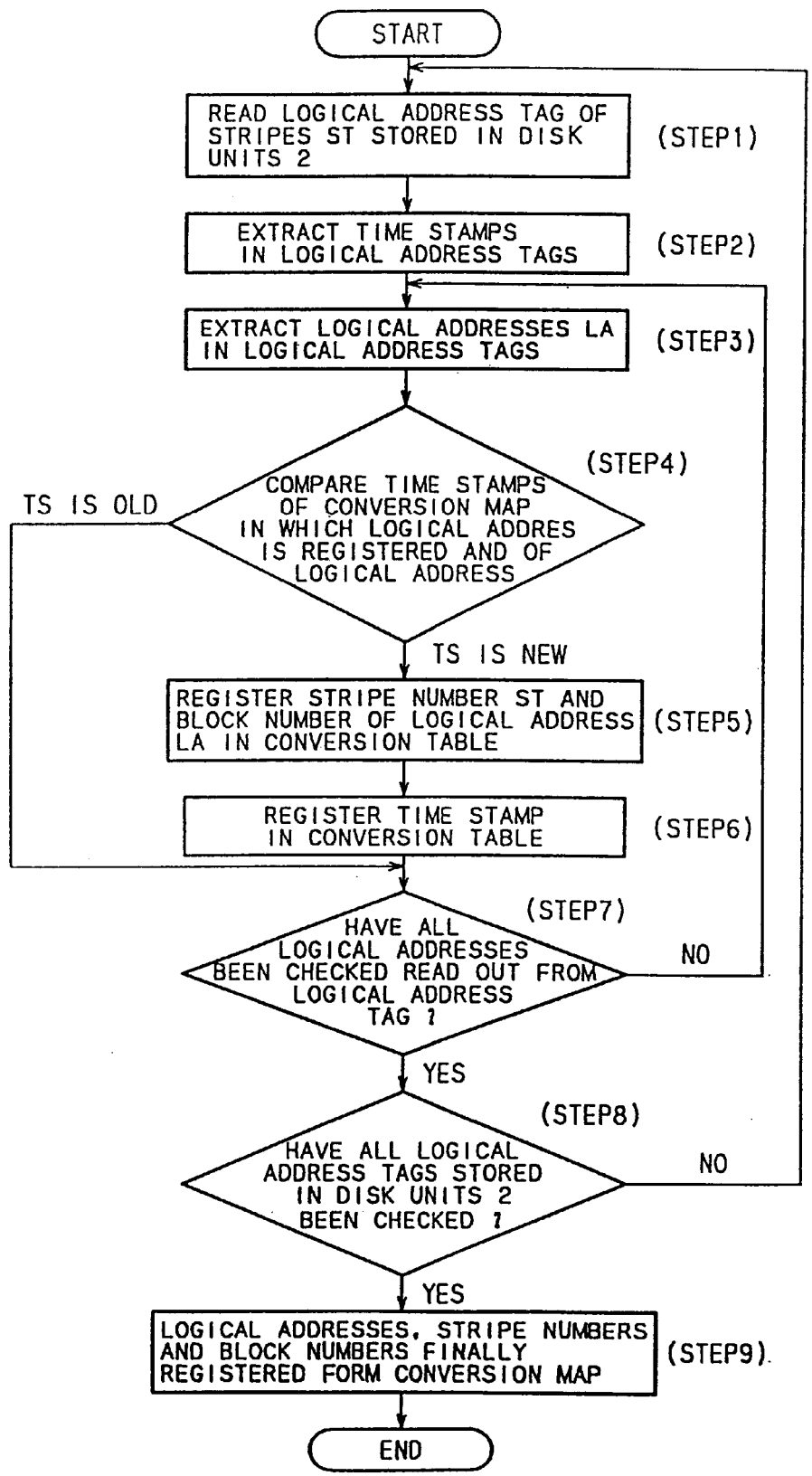
FIG. 9 is a flowchart for explaining a preparation method of a conversion map 32 when starting the system.

Further, to prepare the conversion map 32 at the time when the system is started, the logical address tags TG1, TG2, TG3, . . . of the stripes ST1, ST2, ST3, . . . stored in the disk unit 2 are read in order (STEP 1) as illustrated in the flowchart in FIG. 9. Then, extract the time stamps TS1, TS2, TS3, . . . and read logical address tags TG1, TG2, TG3, . . . (STEP 2). Further, extract the logical addresses LAXX in the read logical address tags TG1, TG2, TG3, . . . in order (STEP 3). When the logical address LAn is the same as the extracted logical address LAn, it is registered in the conversion map 32, the time stamp TSn of the logical address LAn registered in the conversion map 32 is compared with the time stamp TSn of the extracted logical address LAn (STEP 4). As a result of this comparison, if the time stamp TSi of the extracted logical address LAn is newer than the time stamp TSj of the logical address LAn registered in the conversion map 32, that is, if TSi is larger than TSj, the stripe number ST# of the disk unit 2 from which the logical address LAn is extracted is registered in the conversion map 32 and further, the data block location BLK# is stored (STEP 5). Further, the time stamp TS# for the extracted address LAn is stored as the time stamp TS# for the logical address LAn in the conversion map 32 (STEP 6). As a result of the comparison in STEP 4, if the time stamp TSi of the extracted logical address LAn is older than the time stamp TSj of the logical address LAn registered in the conversion map 32, that is, if TSi is smaller than TSj, then the contents of the stripe ST# for the logical address LAn, the data block location BLK# and the time stamp TS# registered in the conversion map 32 are left as they are, and a determination is made whether all valid logical addresses that were read have been checked (STEP 7). If all logical addresses that were read were not checked, then return to STEP 3, repeat the processes up to STEP 6. If the same processes were completed on all of the logical addresses in the read out logical address tags, check whether the above described processes were executed on all of the logical address tags TG1, TG2, TG3, . . . stored in the disk unit 2 (STEP 8). If the same processes were not completed, return to STEP 3, repeat the processes up to STEP 7. And if the same processes were completed, make the contents of the stripe ST#, data block location BLK# and time stamp TS# for the logical addresses that were left at that point of time as the contents to be registered in the conversion map 32 (STEP 9).

In other words, only when the time stamps of the logical address tags are larger than the time stamps of the table in the conversion map 32 for all logical addresses in the taken out logical address tags, register the stripe number and corresponding block numbers on the table. When this check is executed for all stripes, a conversion table indicating only valid blocks is obtained. Further, only valid blocks are always registered on this conversion map 32 when the same process is executed for logical address tags whenever stripes are written in the disk unit 2. Further, even when the data registered on this conversion table becomes improper due to failure in the memory, they can be detected and corrected by comparing and inspecting the logical address tags of the stripes with the conversion map.

Figure 10:
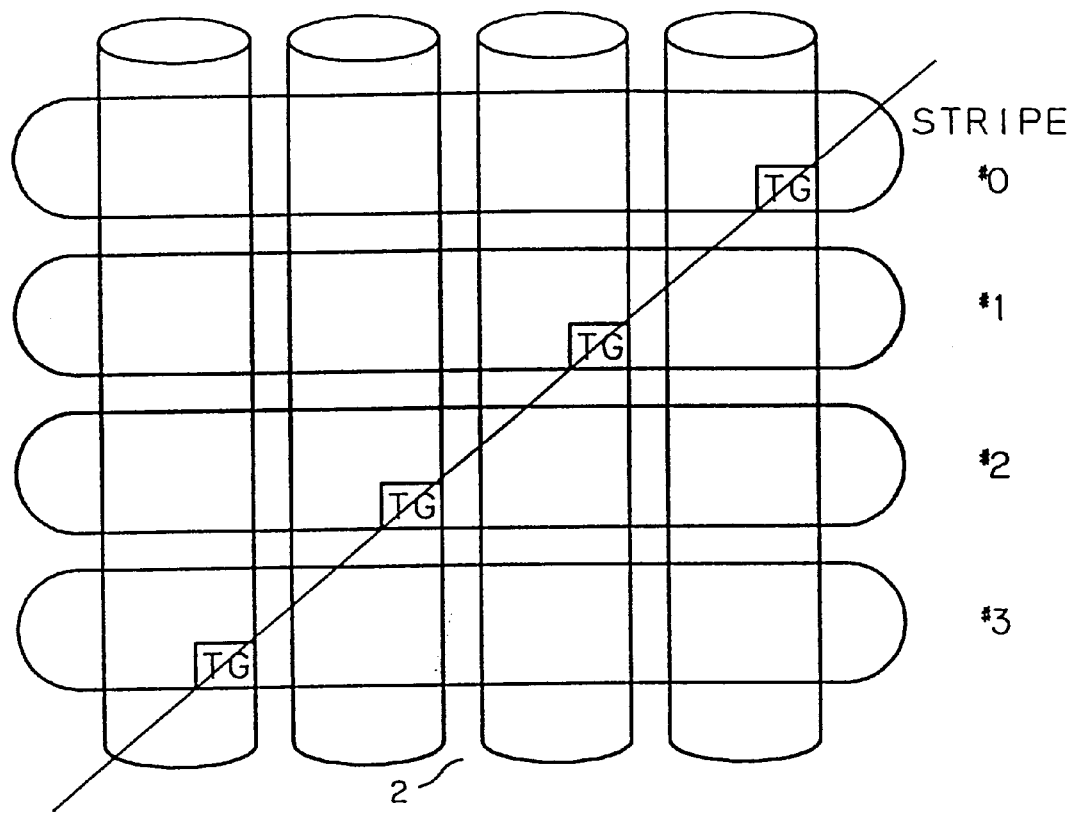
FIG. 10 is a diagram illustrating an example wherein logical address tags are dispersed and stored in 4 disk units by stripe.

As described above, the principal process of the preparation of the conversion map is to inspect the logical address tags. Therefore, when the number of logical address tags is many as in a large capacity disk unit, an extended time will be required to prepare a conversion map. In particular, if the logical address tag blocks are concentrated on one disk unit 24 as illustrated in FIG. 2, the access is concentrated to this disk at the time when the system is started and the logical address tags cannot be checked in parallel with them. So, the time required for preparing this conversion map can be reduced to ¼ by dispersing the disk unit into which the logical address tags are stored by the stripe into 4 units and checking the logical address tags in parallel, as illustrated in FIG. 10.

Figure 11:
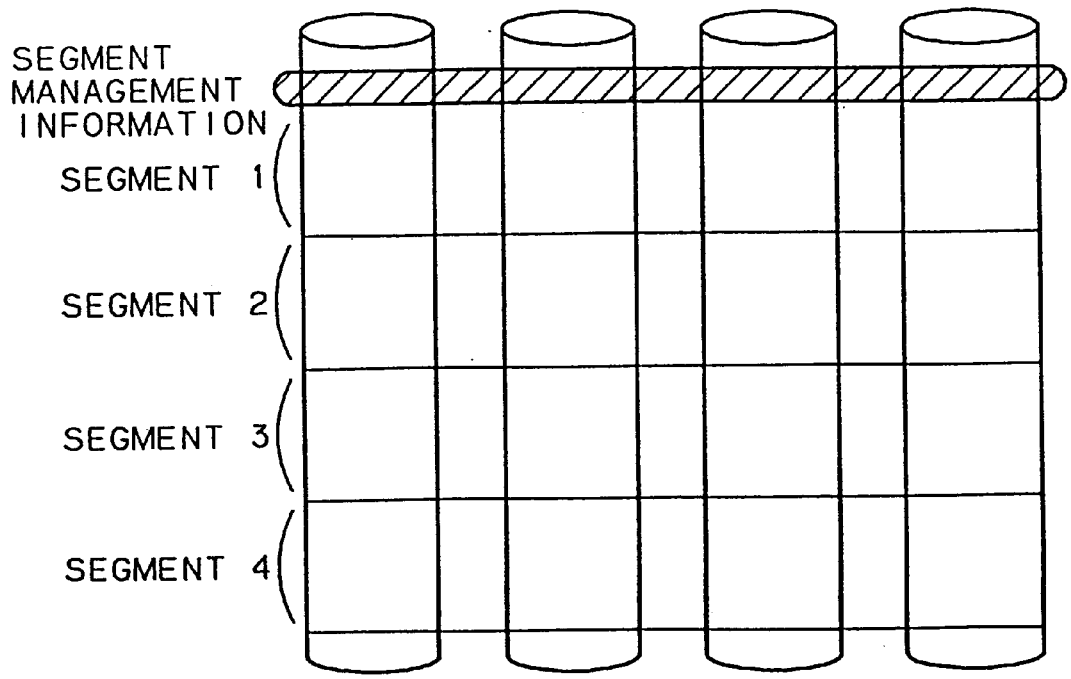
FIG. 11 is a diagram illustrating the allocation of the storage areas of the disk unit in the segment division.

In addition, by dividing and managing the storage area of the disk unit 2 into a plurality of segments, the number of inspections of the logical address tags required for preparing the conversion map can be reduced. In FIG. 11, the structure of the storage area of the disk unit in the segment division system is shown. As illustrated in FIG. 11, the storage area of the disk unit is divided into a segment management information (hatching) and 4 segments in unit of stripe. Here, the segment is a unit area wherein the collective writing of buffer data or the disk writing in the refilling process is concentrated in some period. For instance, as long as the segment 2 is an object of the disk writing, the selection of an empty area is so controlled that no writing is made in the segments 1, 3, 4.

Figures 12, 13:
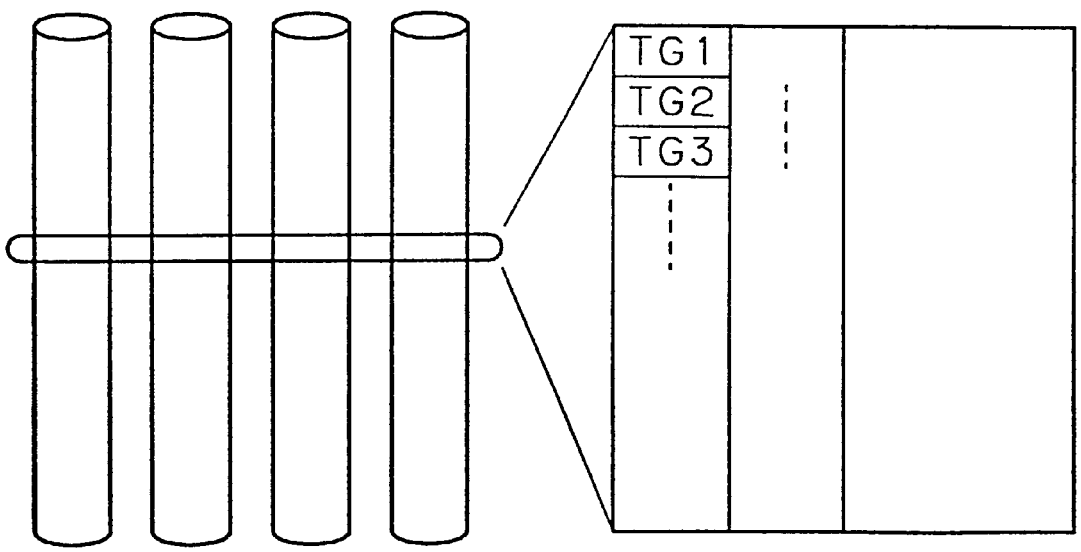
FIG. 12 is a diagram illustrating the entry structure of the segment management information.
FIG. 13 is a diagram illustrating the contents of the dedicated tag area wherein the logical address tags are successively stored.

Further, when the empty area of a segment becomes less and the disk writing is changed over to another segment, the segment management information is stored in the disk unit. The segment management information is composed of a segment number and a change-over conversion map as illustrated in FIG. 12. The segment number is the segment number to which the data writing is changed over and the change-over conversion map is the state of the conversion map on the volatile memory 3 when a segment is changed over. Furthermore, all the data of a change-over conversion map is not overwritten whenever a segment is changed over, but only the entries of the logical addresses written in the preceding segment may be written back. If, therefore, the time stamp is stored when the preceding segment is switched and compared with the time stamp of the conversion map, the logical addresses written in the preceding segment can be determined.

In this segment division system, the segment management information is retained when a segment is changed over. So, by simply reading the conversion map at the time of segment change-over from the segment management information and then, by inspecting the logical address tag of the segment indicated by the segment number of the segment management information, a conversion map which is the same as that when all logical address tags were inspected can be reproduced. Therefore, the number of inspections required for logical address tags is one segment and a time required to prepare a conversion map in this example can be reduced to ¼ according to this system.

Further, a bit map corresponding to all stripes in the segments on the non-volatile memory 4 is prepared. When a segment is to be switched, this bit map is cleared. When a bulk/collective write is performed or when a write in compaction/refilling is performed, the bit corresponding to each written stripe is set to "1". Thus, the bit map corresponding to a stripe that was changed after the segment change-over will become "1". Accordingly, when preparing a conversion map, it is possible to further reduce the number of inspections and a time required for preparing a conversion map by referring to this bit map and inspecting a logical address tag for a stripe that was changed.

The size of a logical address tag is normally 512–1024 bytes and there is a performance difference of about 50 times between the sequential access and the random access of a disk. In the system illustrated in FIG. 2, the logical address tag information are scattered for every stripes and therefore, the time consuming random access was used when preparing a conversion map. So, a dedicated tag area (for each segment when dividing segments) for contiguously storing only logical address tags is prepared so that the logical address tags can be read at the sequential access as fast as 50 times of the random access as illustrated in FIG. 13. For the collective writing data from a host equipment or refilling data writing, logical address tags are written not only in an empty area but also in a corresponding dedicated tag area. In the system illustrated in FIG. 2, the number of disk writings was 4 times per stripe but according to this method, it is increased one time for the writing of logical address tags into the dedicated area. However, as the speed of the conversion map preparation becomes as high as 50 times, this method is a very efficient means when a startup time of a disk unit becomes a problem. In order to minimize the time required to write data in the dedicated tag area, the dedicated area is set around a target area as a center, as illustrated in FIG. 13, so as to shorten the seek time of each disk drive. Further, the write to the disk unit 2 is made in unit of sector (512 bytes, etc.) and logical address tags are allocated in the dedicated tag area in unit of sector so that the reading is not required when writing logical address tags.

Lastly, the time stamp will be explained. As time stamps are stored on the volatile memory 3 as illustrated in FIG. 1, the time stamps stored on the volatile memory 3 may be erased because of power source fault, etc. So, similarly to the conversion map, the logical address tags for all stripes are checked only when starting the system and a value next to the largest time stamp 5 is set in the time stamp 5 in the volatile memory 3. Further, the time reduction technique described in the explanation of the conversion map preparation is applicable directly to the reproduction of time stamps.

Further, the value of time stamp 5 is incremented whenever the time stamp 5 is written into the disk unit and is used for judging the write sequence. As an example, a case where the time stamp 5 is constructed by a 24 bit counter will be explained. In case of the 24 bit counter, the counter turns round by 16 M times and a count value returns to zero. In general, the effective minimum value of the time stamp 5 is set as a reference, and 16 M is added to a value smaller than the reference to be used for comparison and determination. This minimum value is also obtained by investigating logical address tags of all stripes only when the system is started.

However, use of this technique is based on the assumption that the maximum value of time stamp does not exceed the minimum value, that is, a difference between the maximum and minimum values of time stamps is within a range that can be expressed by 24 bits. It is therefore necessary to update the time stamp value to a new value by updating all stripes before the time stamp 5 turns one turn. To achieve this, stripes in which invalid blocks have not been updated in at least an interval corresponding to a predetermined number of writes are selected to be refilled, or only the logical address tags of stripes in which NULL addresses are set as the logical addresses of invalid blocks are rewritten. The method using NULL addresses is a method of rewriting logical address tag blocks, and hence is a light-load process as compared with a refilling process.

Further, in the embodiment described above, only a method to judge invalid blocks by comparing logical address tags of two stripes ST1, ST2 each other was explained. To check all invalid blocks it is necessary to check all combinations between two stripes. With a conversion map, however, in checking the respective logical addresses in the logical address tags, a time stamp of the conversion map indicating invalid data is compared with the time stamp of a corresponding stripe, and a block with a smaller value can be determined as an invalid block.

Figure 14:
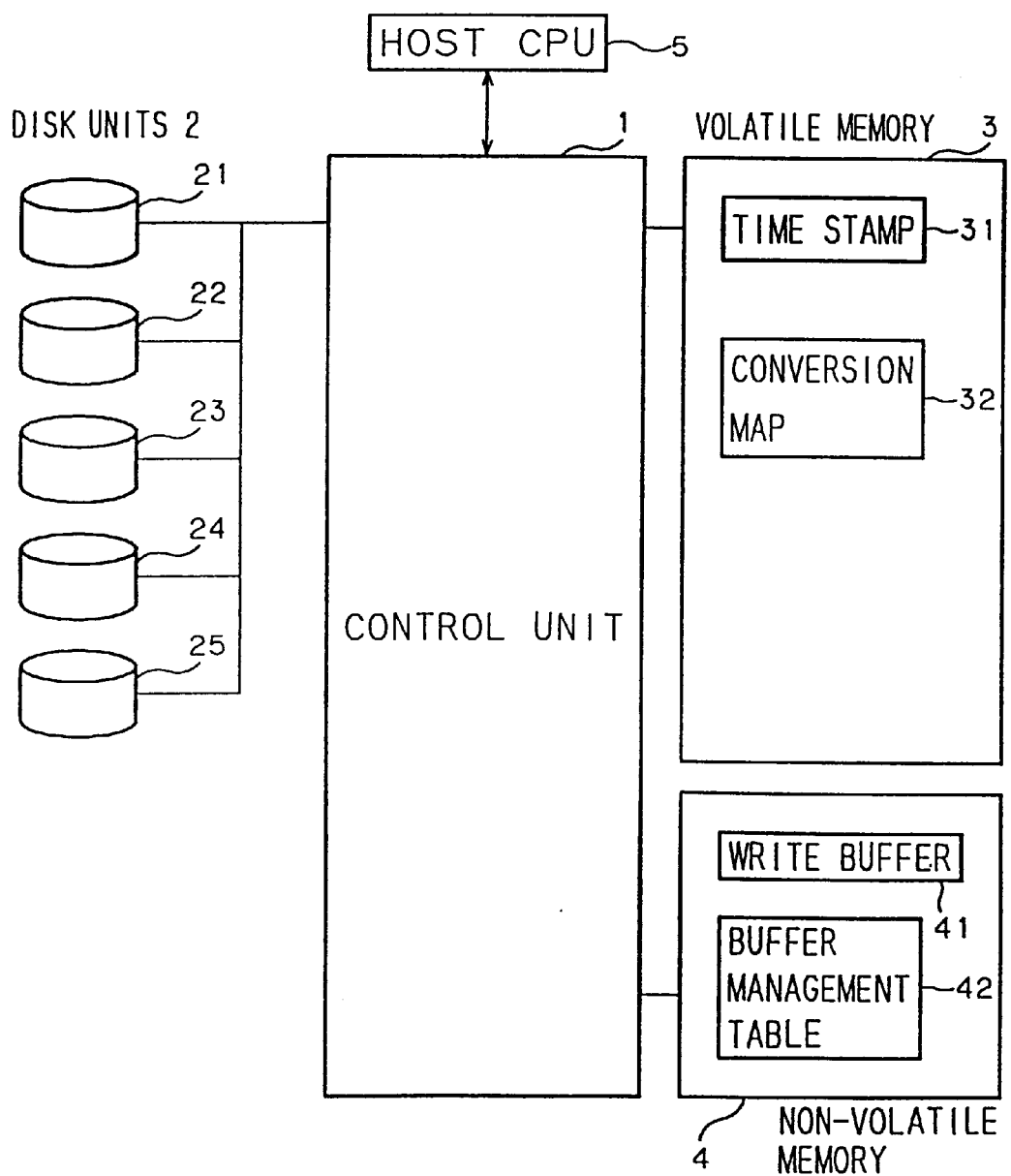
FIG. 14 is a block diagram illustrating an embodiment of the disk unit by RAID5 that is constructed with the present invention applied.

FIG. 1 illustrates the structure of RAID0 to disperse data to a plurality of disks and the system of the present invention is also applicable to the redundant disk structure (RAID4, 5) using the parity. The conceptual diagram of a disk storage in the RAID5 structure consistent with the present invention is illustrated in FIG. 14. This is the structure illustrated in FIG. 1 added with a redundant disk unit 25, and the control unit 1, disk unit 2 (21, 22, 23, 24), volatile memory 3, non-volatile memory 4, time stamp 5, write buffer 6 and buffer management information 7 have the same functions as those of the embodiment illustrated in FIG. 1.

The operation of the embodiment illustrated in FIG. 14 will be explained with attention paid to a difference with the embodiment illustrated in FIG. 1. In the write process, at the stage where write data from a host equipment are accumulated in number less by 1 block than 1 stripe (K*4−1) in the write buffer 6, the control unit 1 goes to write these data in the disk units 21–25. At this time, the steps to prepare the logical address tag block as the last write block from the logical addresses of the blocks stored in the write management table 7 and the time stamp 5 on the volatile memory 3 are the same as those in the embodiment illustrated in FIG. 1.

Figure 15:
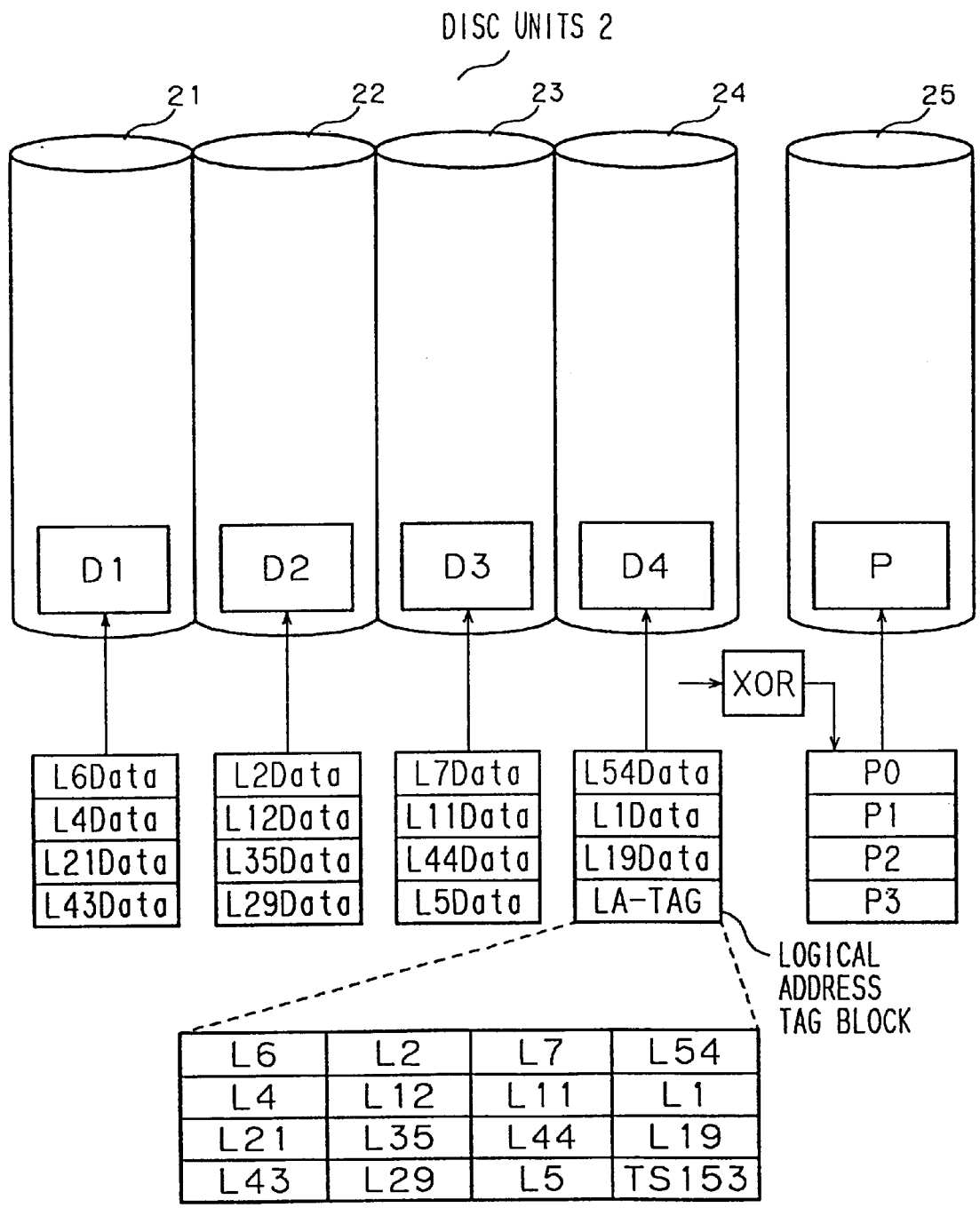
FIG. 15 is a diagram illustrating the operating concept of the embodiment shown in FIG. 13.

Thereafter, from data for 1 stripe added with this logical address tag block, the exclusive OR (XOR) operation is executed for every stripe unit and a parity stripe unit is prepared. Then, the stripe data with this parity are simultaneously written in the empty areas of the disk units 21–25 collectively. Further, the value of the time stamp 5 is incremented at the stage where the write is completed. Thus, in addition to the collective one time data writing, it is not required to read old data and old parity block for the parity calculation and therefore, the number of disk accesses can be further reduced. Similarly, the stripe refilling process is also written into the disk unit 2 after preparing a stripe with a parity. This state is illustrated in FIG. 15.

In the parity RAID structure, even when one disk unit becomes faulty, the data of the faulty disk can be reproduced by computing XOR of data of another disk that is composed of a stripe and parity and the service as a disk storage can be provided successively. However, if one disk unit was out of order when starting the system, as a logical address tag is reproduced by reading data out of a disk unit storing no logical address tag and then inspected, time required for preparing a conversion map and thus, time until the system startup is completed will increase sharply.

Figure 16:
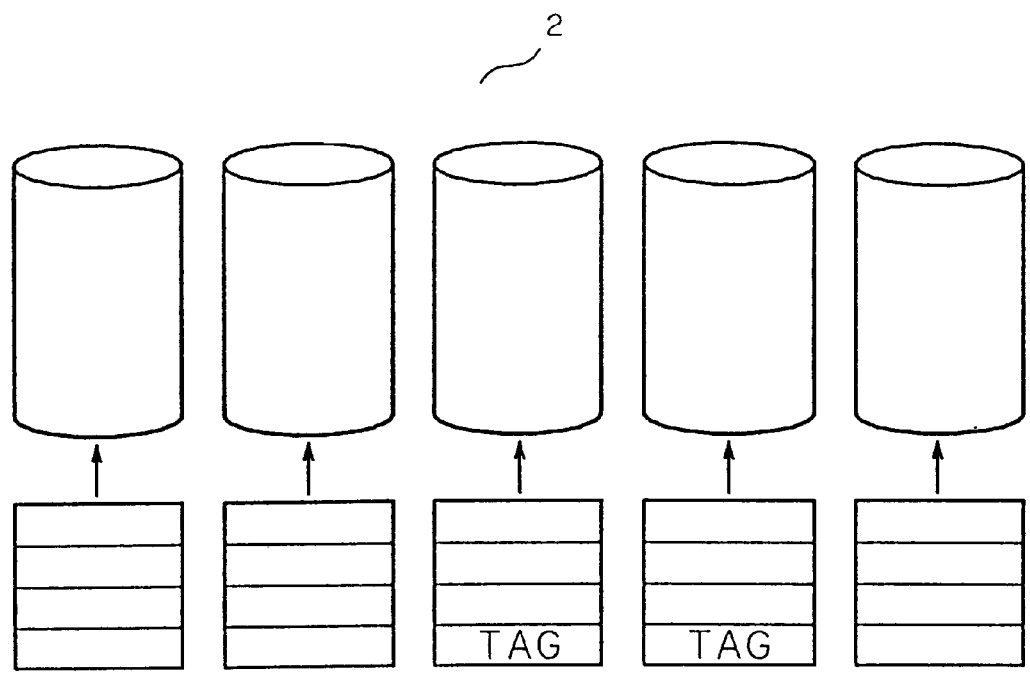
FIG. 16 is a diagram illustrating an example to control so as to write the same logical address tag in two disk units.
Figure 17:
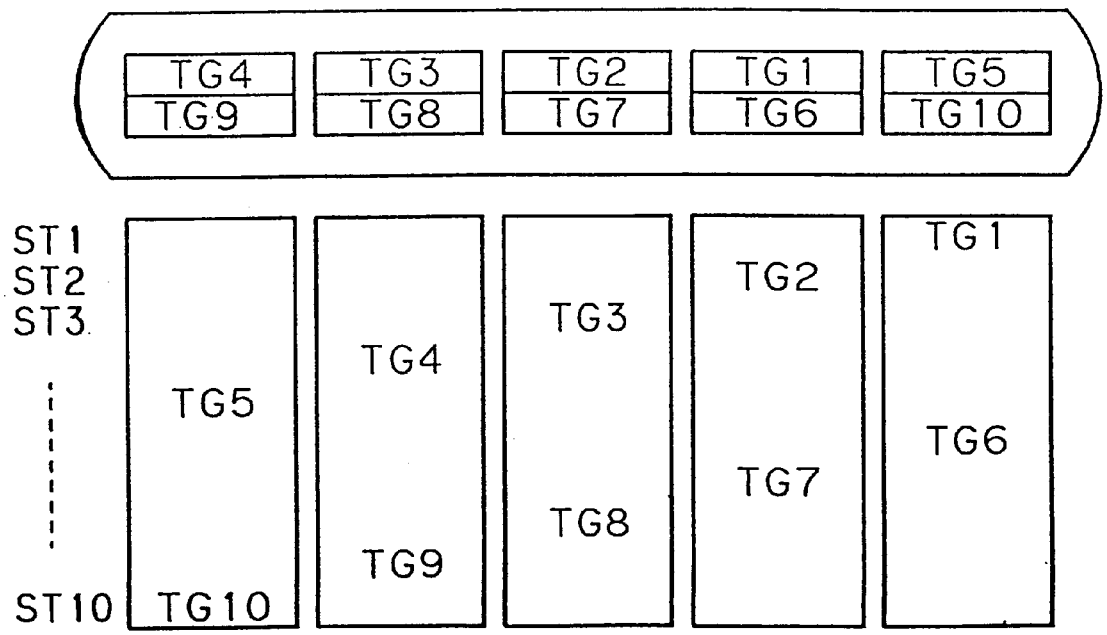
FIG. 17 is a diagram illustrating an example wherein the dedicated tag areas are allocated and used for achieving the high speed conversion map preparation.
Figure 18:
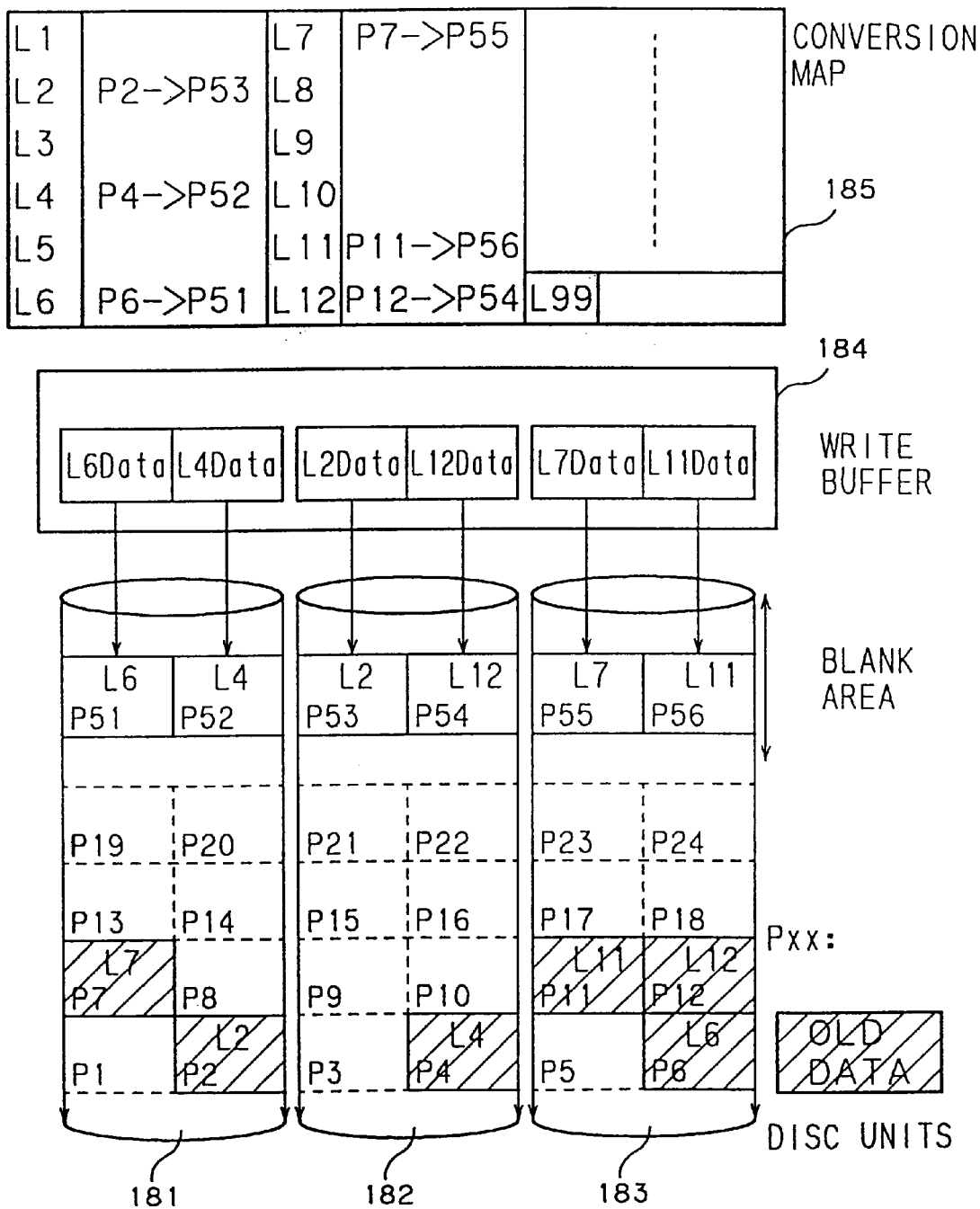
FIG. 18 is a diagram illustrating a system configuration to achieve a data updating method in a conventional example.

So, as illustrated in FIG. 16, it is controlled so as to write the same logical address tag in two disk units by reducing data blocks composed of a stripe. As a result, even when one disk unit becomes out of order, the remaining logical address tags can be read when preparing a conversion map and a sharp increase of a time needed for the system startup can be avoided.

When a dedicated tag area is to be used to create a conversion map at a high speed, allocation of logical address tags to the dedicated area is controlled such that a disk drive in which logical address tags are stored in a dedicated tag area differs from each disk drive in which logical address tags are stored in stripes, as shown in FIG. 16. With this control, it suffices if one logical address tag is stored in a stripe.

Further, when writing the logical address tags in the dedicated tag area, if parity data is used to take countermeasures against disk failures, two times of write and two times of read become necessary instead of one time so far needed and the disk write overhead at the time of a collective writing and the stripe refilling sharply increases. Therefore, the above countermeasures using parity data are not taken for data in the dedicated tag area.

The data in the dedicated tag area is used to create a conversion map at a high speed. If a disk drive having a dedicated tag area fails, logical address tags in stripes can be checked (by a random access operation) as those stored in the dedicated tag area. No problem is thus posed. In addition, since the number of logical address tags to be checked by a random access decreases to ⅕, a conversion map can be created at a high speed. The present invention is described in the context of a disk storage system having a RAID architecture. However, the present invention is not limited to this area only. That is, the present invention is principally applicable to not only such disk units as magnetic disks but also magnet-optical disks having largely different performances for sequential write and random write, and storages in RAID structure given with redundancy by parity requiring two readings and two writings in the small block updating.

According to the present invention described above, it is not needed to retain conversion maps in a non-volatile memory preparing for the power source failure as the conversion maps can be reproduced any time and accordingly, it is possible to construct a very cheap disk storage. Further, even if the contents of a non-volatile memory are lost due to hardware failure, according to the present invention, only latest written data retained in the write buffer are lost and almost all data on the disks are left, while in a conventional method, all data on the disks are lost as conversion maps cannot be reproduced. Accordingly, durability against failure is largely improved. Further, the recovery process from the power source failure and the normal system startup process are the same and as no special process is needed for the system termination or recovery, the development cost can be reduced. Further, as the process at the system startup can be increased to high speed by the dispersed arrangement of logical address tags to a plurality of disk units, a dedicated tag area capable of sequentially accessing logical address tags, storage area segment division management, etc., the waiting time at the system startup can be suppressed to a range where there is no problem for practical use. In particular, in the parity RAID structure, as logical address tags are recorded in two disk units, the system startup time does not increase even when one of the disk units becomes out of order.

What is claimed is:

1. A method of updating data stored in a disk storage equipped with N number of disk units, where N is a positive integer not less than 2, comprising the steps of:

storing logical block data to be updated in a write buffer memory until the number of the logical blocks reaches N×K−1, where K is an integer indicating the number of blocks;

generating a logical address tag block including logical addresses for these logical blocks and time stamps stored in a time stamp memory;

storing the logical address tag block in the write buffer memory with the N×K−1 logical blocks so as to store a total N×K logical blocks as a stripe in the write buffer memory; and writing the N×K logical blocks in the write buffer memory sequentially into an empty address area which is a stripe area extending over the N numbers of disk units other than the logical address areas that are storing data to be updated on the N units of the disk storage; and incrementing the time stamp memory every time when N×K logical blocks accumulated in the write buffer are written in the N units of disk unit.

2. The method as claimed in claim 1, further comprising the steps of:
   reading the logical address tag blocks stored in the stripe areas of the disk storage;
   detecting physical storage locations on the disk units corresponding to the logical addresses; and
   writing or reading the data into or from the detected storage location.

3. The method as claimed in claim 1, further comprising the steps of:
   inspecting the logical address tag blocks stored in a plurality of stripe areas;
   detecting the stripe areas containing the same logical addresses; and
   judging the logical address block of the stripe area with the latest time stamp in the logical address tag block in the stripe areas containing the same logical addresses to be valid and judging the rest of logical address blocks of the stripe area containing the same logical addresses to be invalid.

4. The method as claimed in claim 3, further comprising the steps of:
   detecting the maximum time stamp value in the inspection of the logical address tag blocks; and
   reproducing a time stamp that is to be added in the next writing based on the maximum time stamp value.

5. The method as claimed in claim 3, further comprising the steps of:
   detecting the minimum time stamp value in the inspection of the logical address tag blocks; and
   judging a write sequence based on the minimum time stamp value which gives a write sequence standard.

6. The method as claimed in claim 1, further comprising the steps of:
   storing data of only valid write block data in the stripe areas in the write buffer;
   generating a new logical address tag block corresponding to these valid logical blocks; and
   writing the logical blocks for one stripe composed of the valid data stored in the write buffer and the newly generated logical address tag successively into an empty areas on the disk units.

7. The method as claimed in claim 6, further comprising the step of setting a NULL address for logical addresses corresponding to blocks in which data in a new logical address tag block are not stored if the number of valid blocks is less than N×K−1 when generating a new logical address tag block.

8. The method as claimed in claim 1, further comprising the step of recording a registration data including the stripe numbers for the logical addresses judged to be valid, block numbers in the stripes and time stamps of the stripes on a conversion map at the time when the disk unit is started its operation.

9. The method as claimed in claim 8, further comprising the step of:
   reading the logical address tag blocks of the stripes in a time zone with less access to the disk units;
   comparing the time stamps in the logical address tag blocks of the stripes with the time stamp corresponding to the same logical address as the logical address in the logical address tag recorded in the conversion map; and
   correcting the registration data in the conversion map if the time stamps in the logical address tag blocks of the stripes is later than the time stamp in the conversion map.

10. The disk storage data updating method claimed in claim 1, further comprising the steps of:
    storing the logical address tag blocks of the different stripe areas in the different disk units; and
    reading out the logical address tag blocks of the different stripe areas in the different disk units in parallel at the time of inspection of the logical address tag blocks of the different stripe areas.

11. The disk storage data updating method claimed in claim 1, further comprising the steps of:
    storing the logical address tag blocks in a tag memory area which is provided in the disk unit for storing the tag data as well as in the different stripe areas in the disk units; and
    reading out the logical address tag blocks of the tag memory area at the time of inspection of the logical address tag blocks of the different stripe areas.

12. The disk storage data updating method claimed in claim 8, further comprising the steps of:
    dividing the memory area of the disk unit into a plurality of segments each of which is composed of a plurality of stripe areas;
    concentrating the writing operation into the stripe areas to those which are included in one of the segments for a certain time period;
    changing the writing operation into the stripe areas to those which are included in other one of the segments after a certain time period by recording the content of the conversion map at the time of changing the segment and a number of the other segment changed into the disk unit; and
    inspecting the content of the conversion map at the time of changing the segment and the logical address tag blocks included only in stripe areas in the segment which is recorded in the disk unit.

13. The disk storage data updating method claimed in claim 1, characterized in that in order to advance the minimum value of time stamp, the stripe areas with fewer invalid blocks are read periodically and a logical address tag block generated with invalid block logical address made NULL address and added with a new time stamp, and the logical address tag block generated here is overwritten on the real logical address tag block.

14. The disk storage data updating method claimed in claim 1, characterized in that in order to advance the minimum value of time stamp, the stripe areas with fewer invalid blocks are read periodically and a logical address tag block generated with invalid block logical address made NULL address and added with a new time stamp, and the logical address tag block generated here is overwritten on the read logical address tag block.

15. A disk storage data updating method claimed in claim 8, characterized in that after preparing a conversion map, invalid blocks are judged by comparing a time stamp of a logical address tag block on the disk unit with a time stamp of the corresponding conversion map.

16. A method of updating data stored in a disk storage equipped with N number of disk units, where N is a positive integer not less than 2, comprising the steps of:
    accumulating logical block data to be updated in a write buffer memory having a capacity of ×K−1 number of the logical blocks, where K is an integer indicating the number of blocks, until the number of the logical blocks reaches to the N×K−1 number;

generating a logical address tag block including logical addresses for the logical blocks accumulated in the write buffer;

generating K parity blocks from N×K−1 data logical blocks with the logical address tag block added to logical blocks of the N×K−1 number; and writing N×K logical blocks with a parity block added to the data logical blocks as a stripe in an empty area separate from an area retaining data to be updated on N disk units by the continuous writing operation.

17. A method for updating data stored in a disk storage equipped with N+1 number of disk units, where N is a positive integer not less than 2, comprising the steps of:

storing logical block data to be updated in a write buffer memory having a capacity of N×K number of the logical blocks, where K is an integer indicating the number of blocks, until the number of the logical blocks reaches N×K−2;

generating two logical address tag blocks including logical addresses for the logical blocks of N×K−2 and time stamps stored in a time stamp memory for storing in the remaining two blocks in the write buffer memory:

generating K parity blocks corresponding to K number of stripe data including N×K−2 data logical blocks with the two logical address tag blocks added to logical blocks of N×K−2 using exclusive logical operation: and writing N×K−2 logical blocks and K number of parity blocks with the two logical address tag blocks, as a stripe, sequentially in an empty area other than an area that stores data to be updated on N+1 disk units so that the two logical address tag blocks are stored in different disk units.

18. The disk storage data updating method claimed in claim 16, characterized in that to inspect the logical address tag blocks recorded in the disk units, in addition to the sequential write in unit of parity stripe, the logical address tag is also written in a dedicated tag area in which logical address tags are collected, the written data in this dedicated tag are not protected by parity but the dedicated tag areas are allocated so that a disk unit to record logical address tags in the parity stripe is differentiated from the disk unit to record logical address tags in the dedicated tag areas.

19. A disk storage controller comprising:

N units of disk unit, where N is a positive integer not less than 2;

a control unit to write data in N units of disk unit or read data from N unit of disk unit according to instructions from a host equipment;

a first memory connected to the control unit including a time stamp storage portion and a conversion map storage portion;

a second memory connected to the control unit including a write buffer storage portion having a storage capacity equivalent to N×K where K is an integer indicating the number of blocks, logical block data and a buffer control table portion; and a control means which accumulates logical block data to be updated in the write buffer until the number of logical blocks reaches N×K−1, generates a logical address tag block containing time stamps stored in the time stamp storage portion, adds this logical address tag block to the N×K−1 logical blocks to a total N×K logical blocks, and writes the N×K logical blocks as a stripe on the N units of disk unit in an empty address area separate from the logical address area retaining them in order.

20. A disk storage controller comprising:

a disk storage including N units of disk units, where N is a positive integer not less than 2;

a write buffer having a capacity equivalent to N×K−1 logical blocks,, where K is an integer indicating the number of blocks; and a sequential write control unit;

said sequential write control unit further comprising:
  a first means for accumulating logical blocks of data to be updated in this write buffer;
  a second means for retarding the updating of the logical blocks until the accumulated logical blocks reach a selected number;
  a third means for generating a logical address tag block comprising logical addresses of logical blocks accumulated in the write buffer; and
  a fourth means for generating K parity blocks from N×K−1 data logical blocks with the logical address tag block added to the selected number of logical blocks and writes N×K logical blocks with parity blocks added to this data logical blocks in an empty area separate from areas retaining data to be updated on N units of disk unit successively.

* * * * *